(12) United States Patent
Noh

(10) Patent No.: US 7,680,328 B2
(45) Date of Patent: Mar. 16, 2010

(54) HISTOGRAM GENERATING DEVICE

(75) Inventor: Yo-Hwan Noh, Gyeonggi-do (KR)

(73) Assignee: Mtekvision Co., Ltd., Seoul (KR)

( * ) Notice: Subject to any disclaimer, the term of this patent is extended or adjusted under 35 U.S.C. 154(b) by 805 days.

(21) Appl. No.: 11/555,362

(22) Filed: Nov. 1, 2006

(65) Prior Publication Data

US 2008/0101696 A1 May 1, 2008

(51) Int. Cl.
*G06K 9/00* (2006.01)
(52) U.S. Cl. .................. 382/168; 382/169; 382/170; 382/171; 382/172
(58) Field of Classification Search ................ 382/162, 382/168, 169, 170, 171, 172; 348/E5.073
See application file for complete search history.

(56) References Cited

U.S. PATENT DOCUMENTS

| | | | |
|---|---|---|---|
| 5,748,773 A | 5/1998 | Tashiro et al. | |
| 6,002,796 A * | 12/1999 | Kawa et al. | 382/168 |
| 6,018,589 A | 1/2000 | Hyodo | |
| 6,559,837 B1 | 5/2003 | Lasneski et al. | |
| 7,013,044 B2 | 3/2006 | Wang | |
| 2003/0210815 A1 | 11/2003 | Ruggiero et al. | |
| 2004/0091167 A1 | 5/2004 | Teratani et al. | |
| 2005/0157924 A1 | 7/2005 | Kato | |
| 2006/0164523 A1 | 7/2006 | Jiang et al. | |

FOREIGN PATENT DOCUMENTS

| | | |
|---|---|---|
| KR | 10-1996-0009087 | 10/1996 |
| KR | 10-2005-0065427 | 6/2005 |

OTHER PUBLICATIONS

Steffen Müller; A New Programmable VLSI Architecture for Histogram and Statistics Computation in Different Windows; 1995; pp. 73-76; Hamburg, Germany.

* cited by examiner

*Primary Examiner*—Anh Hong Do
(74) *Attorney, Agent, or Firm*—Birch, Stewart, Kolasch & Birch, LLP

(57) ABSTRACT

A histogram generating device is disclosed. An embodiment has a brightness signal generating module generating a brightness signal by use of RGB component data of an input frame, an image component data selecting module outputting a single component frame consisting of image component data, which is one of the RGB component data and the brightness signal, an interval histogram generating module generating a level value by calculating the number of image component data belonging to each level grouped by a histogram resolution as a detection interval of the plurality of successive single component frames is changed, and a memory storing a plurality of level values generated for each of the single component frames.

25 Claims, 8 Drawing Sheets

(A) Histogram before passing through low-pass filter (B) Histogram after passing through low-pass filter

FIG. 6

|  | cnt1 | cnt2 | cnt3 | cnt4 | cnt5 | cnt6 | cnt7 | cnt8 |
|---|---|---|---|---|---|---|---|---|
| Frame 1 | 0~7 | 32~39 | 64~71 | 96~103 | 128~135 | 160~167 | 192~199 | 224~231 |
| Frame 2 | 0~15 | 32~47 | 64~79 | 96~111 | 128~143 | 160~175 | 192~207 | 224~239 |
| Frame 3 | 0~23 | 32~55 | 64~87 | 96~119 | 128~151 | 160~183 | 192~215 | 224~247 |
| Frame 4 | 0~31 | 32~63 | 64~95 | 96~127 | 128~159 | 160~191 | 192~223 | 224~255 |

(A) Interval assigned to each counter   with weighted value

|  | cnt1 | cnt2 | cnt3 | cnt4 | cnt5 | cnt6 | cnt7 | cnt8 |
|---|---|---|---|---|---|---|---|---|
| Frame 1 | 0~7 | 32~39 | 64~71 | 96~103 | 128~135 | 160~167 | 192~199 | 224~231 |
| Frame 2 | 8~15 | 40~47 | 72~79 | 104~111 | 136~143 | 168~175 | 200~207 | 231~239 |
| Frame 3 | 16~23 | 48~55 | 80~87 | 111~119 | 144~151 | 176~183 | 208~215 | 240~247 |
| Frame 4 | 24~31 | 56~63 | 88~95 | 120~127 | 152~159 | 184~191 | 216~223 | 248~255 |

(B) Interval assigned to each counter   without weighted value

|  | Output1 | Output2 | Output3 | Output4 | Output5 | Output6 | Output7 | Output8 |
|---|---|---|---|---|---|---|---|---|
| Frame 1 | 0~7 | 32~39 | 64~71 | 96~103 | 128~135 | 160~167 | 192~199 | 224~231 |
| Frame 2 | 8~15 | 40~47 | 72~79 | 104~111 | 136~143 | 168~175 | 200~207 | 231~239 |
| Frame 3 | 16~23 | 48~55 | 80~87 | 111~119 | 144~151 | 176~183 | 208~215 | 240~247 |
| Frame 4 | 24~31 | 56~63 | 88~95 | 120~127 | 152~159 | 184~191 | 216~223 | 248~255 |

(C) Output value

FIG. 7

| | cnt1 | cnt2 | cnt3 | cnt4 | cnt5 | cnt6 | cnt7 | cnt8 |
|---|---|---|---|---|---|---|---|---|
| Frame 1 | 0~15 | 32~47 | 64~79 | 96~111 | 128~143 | 160~175 | 192~207 | 224~239 |
| Frame 2 | 0~31 | 32~63 | 64~95 | 96~127 | 128~159 | 160~191 | 192~223 | 224~255 |

(A) Histogram resolution = 16

| | cnt1 | cnt2 | cnt3 | cnt4 | cnt5 | cnt6 | cnt7 | cnt8 |
|---|---|---|---|---|---|---|---|---|
| Frame 1 | 0~7 | 32~39 | 64~71 | 96~103 | 128~135 | 160~167 | 192~199 | 224~231 |
| Frame 2 | 0~15 | 32~47 | 64~79 | 96~111 | 128~143 | 160~175 | 192~207 | 224~239 |
| Frame 3 | 0~23 | 32~55 | 64~87 | 96~119 | 128~151 | 160~183 | 192~215 | 224~247 |
| Frame 4 | 0~31 | 32~63 | 64~95 | 96~127 | 128~159 | 160~191 | 192~223 | 224~255 |

(B) Histogram resolution = 32

| | cnt1 | cnt2 | cnt3 | cnt4 | cnt5 | cnt6 | cnt7 | cnt8 |
|---|---|---|---|---|---|---|---|---|
| Frame 1 | 0~3 | 32~35 | 64~67 | 96~99 | 128~131 | 160~163 | 192~195 | 224~227 |
| Frame 2 | 0~7 | 32~39 | 64~71 | 96~103 | 128~135 | 160~167 | 192~199 | 224~231 |
| Frame 3 | 0~11 | 32~43 | 64~75 | 96~107 | 128~139 | 160~171 | 192~203 | 224~235 |
| Frame 4 | 0~15 | 32~47 | 64~79 | 96~111 | 128~143 | 160~175 | 192~207 | 224~239 |
| Frame 5 | 0~19 | 32~51 | 64~83 | 96~115 | 128~147 | 160~179 | 192~211 | 224~243 |
| Frame 6 | 0~23 | 32~55 | 64~87 | 96~119 | 128~151 | 160~183 | 192~215 | 224~247 |
| Frame 7 | 0~27 | 32~59 | 64~91 | 96~123 | 128~155 | 160~187 | 192~219 | 224~251 |
| Frame 8 | 0~31 | 32~63 | 64~95 | 96~127 | 128~159 | 160~191 | 192~223 | 224~255 |

(C) Histogram resolution = 64

FIG. 8

|        | reg1 | reg2  | reg3  | reg4   | reg5    | reg6    | reg7    | reg8    |
|--------|------|-------|-------|--------|---------|---------|---------|---------|
| Frame 1 | 0~7  | 32~39 | 64~71 | 96~103 | 128~135 | 160~167 | 192~199 | 224~231 |
| Frame 2 | 0~15 | 32~47 | 64~79 | 96~111 | 128~143 | 160~175 | 192~207 | 224~239 |
| Frame 3 | 0~23 | 32~55 | 64~87 | 96~119 | 128~151 | 160~183 | 192~215 | 224~247 |
| Frame 4 | 0~31 | 32~63 | 64~95 | 96~127 | 128~159 | 160~191 | 192~223 | 224~255 |

(A) Number of counters = 8

|        | reg1  | reg2   | reg3    | reg4    |
|--------|-------|--------|---------|---------|
| Frame 1 | 0~7   | 64~71  | 128~135 | 192~199 |
| Frame 2 | 0~15  | 64~79  | 128~143 | 192~207 |
| Frame 3 | 0~23  | 64~87  | 128~151 | 192~215 |
| Frame 4 | 0~31  | 64~95  | 128~159 | 192~223 |
| Frame 5 | 0~39  | 64~103 | 128~167 | 192~231 |
| Frame 6 | 0~47  | 64~111 | 128~175 | 192~239 |
| Frame 7 | 0~55  | 64~119 | 128~183 | 192~247 |
| Frame 8 | 0~63  | 64~127 | 128~191 | 192~255 |

(B) Number of counters = 4

|         | reg1  | reg2    |
|---------|-------|---------|
| Frame 1 | 0~7   | 128~135 |
| Frame 2 | 0~15  | 128~143 |
| Frame 3 | 0~23  | 128~151 |
| Frame 4 | 0~31  | 128~159 |
| Frame 5 | 0~39  | 128~167 |
| Frame 6 | 0~47  | 128~175 |
| Frame 7 | 0~55  | 128~183 |
| Frame 8 | 0~63  | 128~191 |
| Frame 9 | 0~71  | 128~199 |
| Frame 10 | 0~79 | 128~207 |
| Frame 11 | 0~87 | 128~215 |
| Frame 12 | 0~95 | 128~223 |
| Frame 13 | 0~103 | 128~231 |
| Frame 14 | 0~111 | 128~239 |
| Frame 15 | 0~119 | 128~247 |
| Frame 16 | 0~127 | 128~255 |

(C) Number of counters = 2

HISTOGRAM GENERATING DEVICE

BACKGROUND OF THE INVENTION

1. Field of the Invention

The present invention is related to an image processing device, more specifically to a device generating a histogram.

2. Background Art

The method for obtaining a histogram through image data is quite simple in a general system, but requires a very large number of counters to realize the method in hardware. In the most general type, if the range of data values that are inputted to a device analyzing a histogram is between 0 and 255, 0-255 counters are required. Each addition adds the counter value by 1 in accordance with the input data value. Through this, a distribution map of pixel values for the image of a screen is created. This way, the most accurate and ideal histogram can be obtained.

However, high-resolution images are inputted into today's image processing devices, increasing the amount of data and requiring the size of the counter to be large enough to cover the high-resolution images. Therefore, it is inevitable that the size of hardware continuously grow, and sufficient storage space be provided, requiring substantial space of hardware in order to accommodate the series of processes in hardware.

SUMMARY OF THE INVENTION

Embodiments of the present invention provide a device that generates a histogram by use of a small number of counters. An aspect of the present invention features a histogram generating device having a brightness signal generating module, the brightness signal generating module generating a brightness signal derived from RGB component data of an input frame, the RGB component data representing an image; an image component data selecting module, the image component data selecting module outputting a plurality of single component frames consisting of image component data, the image component data being one of the RGB component data and the brightness signal; and an interval histogram generating module, the interval histogram generating module generating a level value obtained by calculating the number of occurrences of a predetermined range of the image component data occurring within each predetermined region of the plurality of single component frames, each said predetermined region being substantially changed in each of the single component frames.

Another aspect of the present invention features a histogram generating device having a a brightness signal generating module, the brightness signal generating module generating a brightness signal derived from RGB component data of an input frame; a scaling module, the scaling module regularizing a single component frame consisting of the brightness signal; and an interval histogram generating module, the interval histogram generating module generating a level value by calculating the number of occurrences of a predetermined range of the image component data occurring within each predetermined region of the plurality of single component frames, each said predetermined region being substantially changed in each of the single component frames.

Another aspect of the present invention features a histogram generating device having a pixel value determiner or determination module outputting a detection signal related to a corresponding detection interval when detecting the image component data included in the plurality of detection intervals in which a range changes for each of the single component frames, a plurality of counters counting the detection signal for each of the detection intervals, a plurality of registers storing an output value of the counter for a k−1th single component frame, and a plurality of subtractors calculating a difference between an output value of the counter for a kth single component frame and the value stored in the register. Here, k is larger than 1 and smaller than or equal to the number of frames (F) needed to calculate a histogram.

Another aspect of the present invention features a histogram generating device having a pixel value determiner or determination module outputting a detection signal related to a corresponding detection interval when detecting the image component data included in the plurality of detection intervals in which a start value and an end value of the detection interval are changed for each of a plurality of successive frames, a plurality of counters counting the detection signal for each of the detection intervals, and a plurality of registers storing an output value of each of the counters.

Another aspect of the present invention features a method for generating histogram, comprising the steps of generating a brightness signal derived from RGB component data of an input frame, the RGB component data representing an image; outputting a plurality of single component frames consisting of image component data, the image component data being one of the RGB component data and the brightness signal; and generating a level value obtained by calculating the number of occurrences of a predetermined range of the image component data occurring within each predetermined region of the plurality of single component frames, each said predetermined region being substantially changed in each of the single component frames.

BRIEF DESCRIPTION OF THE DRAWINGS

These and other features, aspects and advantages of the present invention will become better understood with regard to the following description, appended claims and accompanying drawings where:

FIG. 6 shows the setting of detection intervals of a pixel value determiner and level values of a histogram based on the interval setting, in accordance with an embodiment of the present invention;

FIG. 7 shows the change of detection intervals in case the resolution of the histogram is modified; and FIG. 8 shows the change of detection intervals in case the number of counters is modified.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the

DESCRIPTION OF THE EMBODIMENTS

Preferred embodiments of the present invention will be described below with reference to the accompanying drawings.

As used in this application, the terms "module" and "unit" are intended to refer to, but is not limited to, a software or hardware component, which performs certain tasks. A module or component may advantageously be configured to reside on the addressable storage medium and configured to execute on one or more processors. Thus, a module or component may include, by way of example, components, such as software components, object-oriented software components, class components and task components, processes, functions, attributes, procedures, subroutines, segments of program code, drivers, firmware, microcode, circuitry, data, databases, data strictures, tables, arrays, and variables. The functionality provided for in the components and modules may be combined into fewer components and modules or further separated into additional components and modules.

Figure 1:
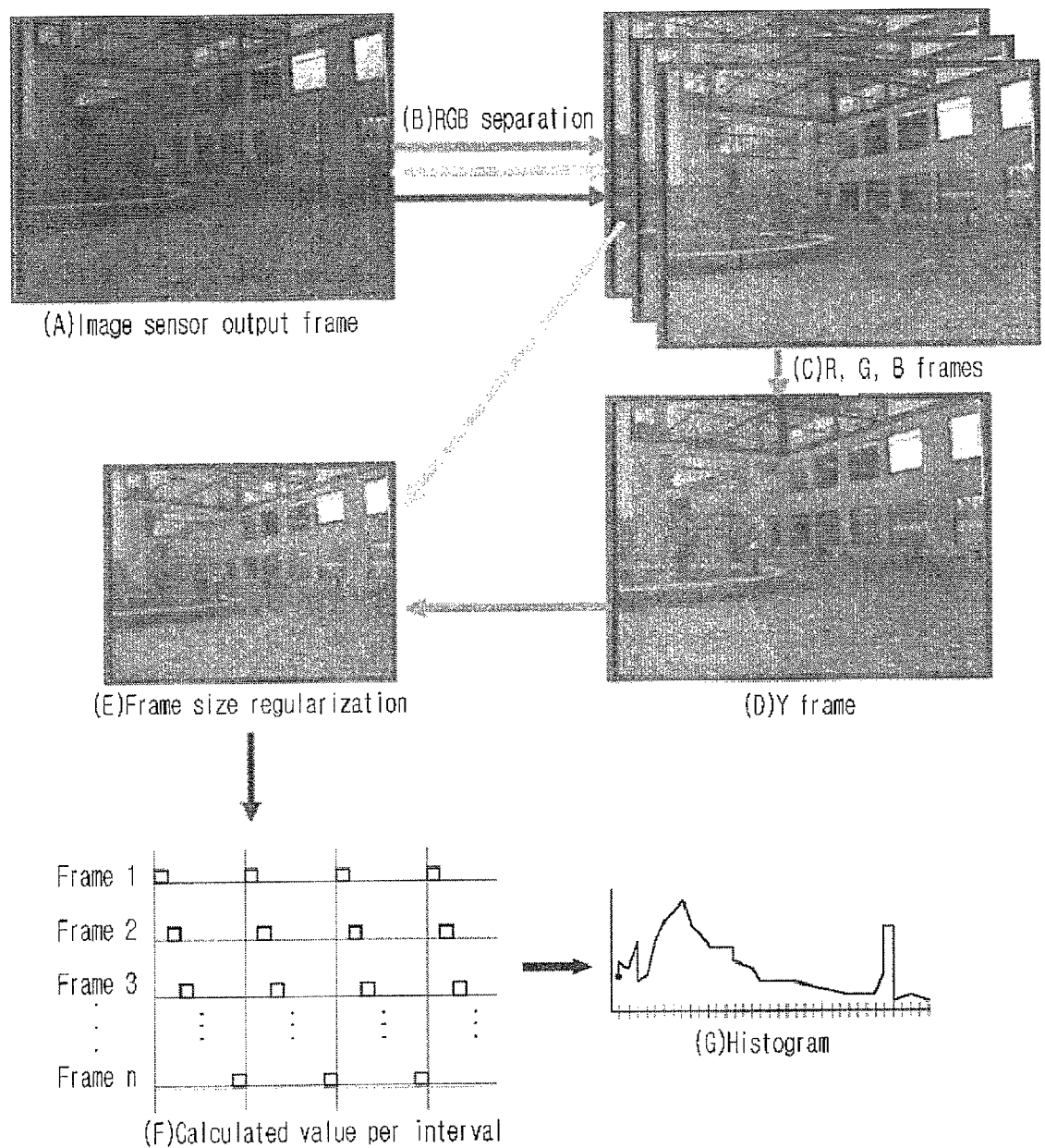
FIG. 1 shows an example of the operation of a histogram generating device in accordance with an embodiment of the present invention.

FIG. 1 is an example showing the operation of a histogram generating device in accordance with an embodiment of the present invention. Generally, an image sensor, such as a CMOS sensor, outputs 15-30 frames per second. When photographing a still image, a user fixes a camera on a fixed subject for several hundred milliseconds to several seconds, during which the image sensor outputs several to tens of the same image. In a typical histogram, image component data, such as a brightness signal, distributed in a frame is separated, and the distribution status of the component is displayed. In other words, in order to generate the histogram of a frame within a period to process the frame, an equal number of counters to the resolution are needed. However, if a series of frames are rendering the same image, the histogram can be generated by using a later frame without having to process a single frame.

The frame outputted from the image sensor goes through a series of processes, including noise reduction and dead pixel compensation, in an image processing device (refer to (A) of FIG. 1). The histogram generating device separates the frame outputted from the image processing device into RGB component data by interpolating the frame (refer to (B) and (C) of FIG. 1). The separated RGB component data is used to generate brightness component data (Y) (refer to (D) of FIG. 1). By selecting one of the RGBY component data and by linear-scaling the size of the single component frame comprising the selected image component data, the frame size is regularized (refer to (E) of FIG. 1). While modifying the range of a plurality of detection intervals on the single component frame, of which the frame size is regularized, the quantity of image component data, located in each interval, is calculated (refer to (F) of FIG. 1). In a single frame, the number of image component data belonging to the same number of detection intervals as the number of counters is calculated. The steps (A) through (F), in which the number of image component data belonging to a plurality of detection intervals is calculated from a single frame, are repeated on frames needed for the calculation of the histogram, and the range of each detection interval changes every time the steps are repeated. The histogram is generated by combining the number of image component data calculated in each frame.

The histogram generating device of this embodiment requires fewer counters than conventional histogram generating devices to obtain a histogram of certain resolution (e.g. 256 levels). The reduction in counters becomes possible by modifying the detection interval for each frame while extracting the number of image component data belonging to some intervals in a plurality of frames. The histogram is generated by accumulating the image component data for different detection intervals generated in each frame.

Figure 2:
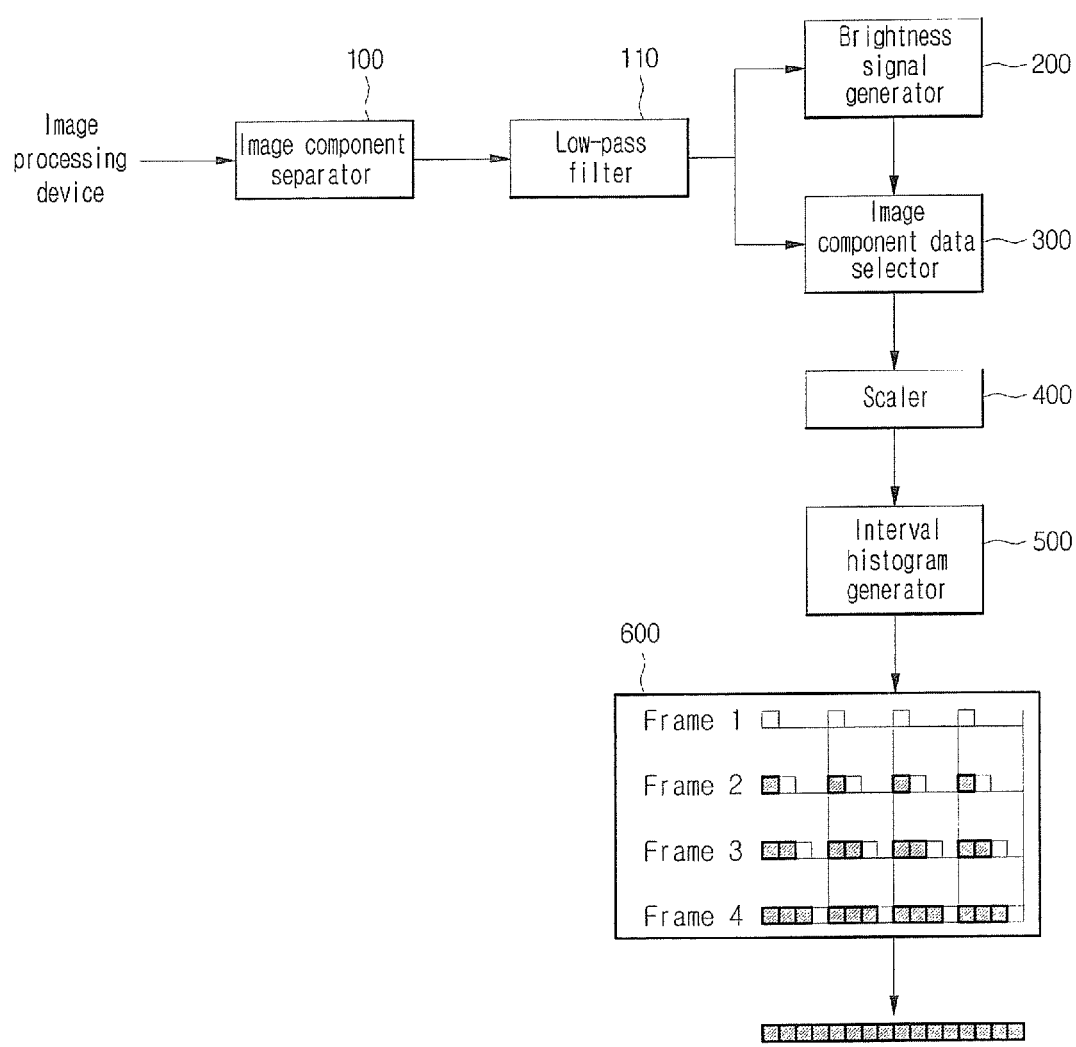
FIG. 2 shows a block diagram of a histogram generating device in accordance with an embodiment of the present invention.

FIG. 2 is a block diagram outlining the histogram generating device in accordance with an embodiment of the present invention.

Figure 3:
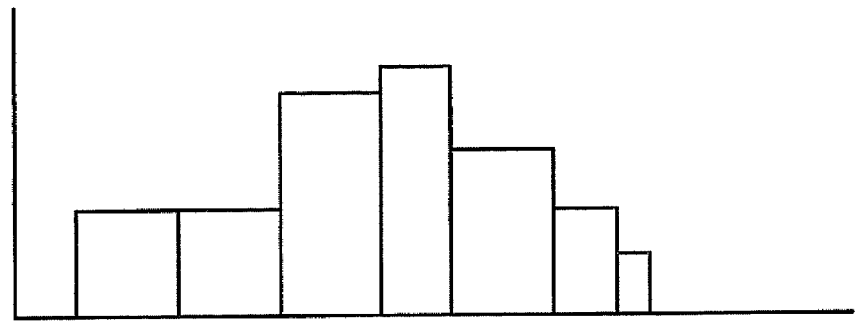
FIG. 3 illustrates the function of a low-pass filter.
Figure 3:
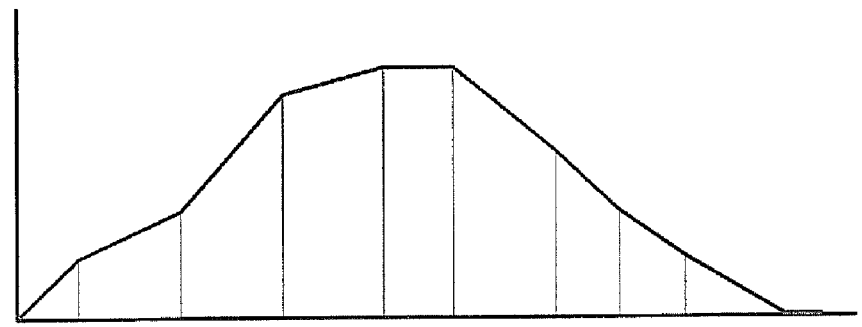

Once an image frame in which noise is reduced and dead pixels are compensated by the image processing device is inputted, an image component separator 100 separates the image frame into RGB component data, using the interpolation method. The separated RGB component data passes through a low-pass filter 110 and is inputted to a brightness signal generator or signal generating module 200 and an image component data selector or selecting module 300. FIG. 3 illustrates the function of the low-pass filter, which passes the RGB component data through the low-pass filter to reduce the staircase of the histogram. In other words, if the RGB component data is passed through the low-pass filter, the histogram has an even distribution.

The brightness signal generator 200 generates a brightness signal from the RGB component data through a color conversion equation, which is $0.299R+0.597G+0.114B$. Of course, many other color conversion equations can be used.

The image component signal selector 300 selects the image component signal to generate the histogram from the RGB & Y signals. The RGB histogram is used to determine how much of the RGB signals are gathered together or single colors. In other words, the RGB histogram is related to white balance. In another embodiment, the image component selector 300 may be excluded.

A scaler or scaling module 400 linear-scales the size of a single component frame to a proper target size. Of course, the frame size may be enlarged in case the frame is small. This is to eliminate the need to increase or decrease the number of counters according to the frame size. Moreover, the steps for increasing/decreasing the frame to the target size regularize the image values to an appropriate size. In other words, while general histograms expresses the sum of a number of data as is, this embodiment proportionally regularizes and expresses each of the image data, thereby allowing the user use the values generated by the histogram generating device as is. Therefore, hereinafter, the operation of increasing or decreasing the size of a single component frame by linear-scaling by the scaler 400 will be called regularizing the frame size. In another embodiment, the scaler 400 may be excluded.

An interval histogram generator or histogram generating module 500 has a plurality of counters and a plurality of registers connected to the counters, and calculates the difference between the current frame value counted by each counter and the previous frame count value stored in the register. The number of counters (X) included in the interval histogram generator 500 and the number of frames needed to generate a histogram by histogram resolution (N) are determined. Here, the range of image component data varies by the number of bits. In the case of 8-bit image component data, there are 256 different values (0-255). Therefore, the maximum value of histogram resolution (N) of an 8-bit image component data is 256. In order to match the histogram resolution (N) with an identifiable image component data value, the number of needed counters or frames increases. Therefore, it is preferable to make image component data values that are continuous by 2 or more be expressed as an identical histogram resolution to make the histogram resolution (N)

smaller than the number of identifiable image component data. However, if the number of counters is large enough to generate with a small number of frames a histogram having a resolution (N) matching the maximum value of identifiable image component data, the histogram resolution (N) can be made to match the number of identifiable image component data. If the range of image component data (R) is fixed, the histogram resolution (N) is inversely proportional to a basic detection unit (U).

Histogram resolution(N)=Range of image component data values(R)/Basic detection unit(U)    EQ. 1

The number of frames (F) needed for the determined histogram resolution (N) is obtained by dividing the histogram resolution (N) with the number of counters (X).

Number of frames(F)=Histogram resolution(N)/Number of counters(X)    EQ. 2

Here, since the image sensor usually outputs 15-30 frames per second, the number of frames (F) should not exceed the maximum number of frames that the image sensor is capable of generating. As the maximum number of frames that can be generated varies by the characteristics of the image sensor, an image sensor generating 15 frames per second under an optimal condition will be described. The detailed structure of the interval histogram generator 500 will be described with reference to FIGS. 4-6.

The number of detection intervals operated by the interval histogram generator 500 matches with the number of counters, and a plurality of detection intervals are applied to every frame. The range of detection interval or region for each frame can be changed by (1) fixing the start value and changing the end value of the detection interval, and subtracting the count value of the previous frame from the count value of the current frame or (2) changing both the start value and the end value. The above methods will be described below with reference to FIGS. 4 and 5.

Figure 4:
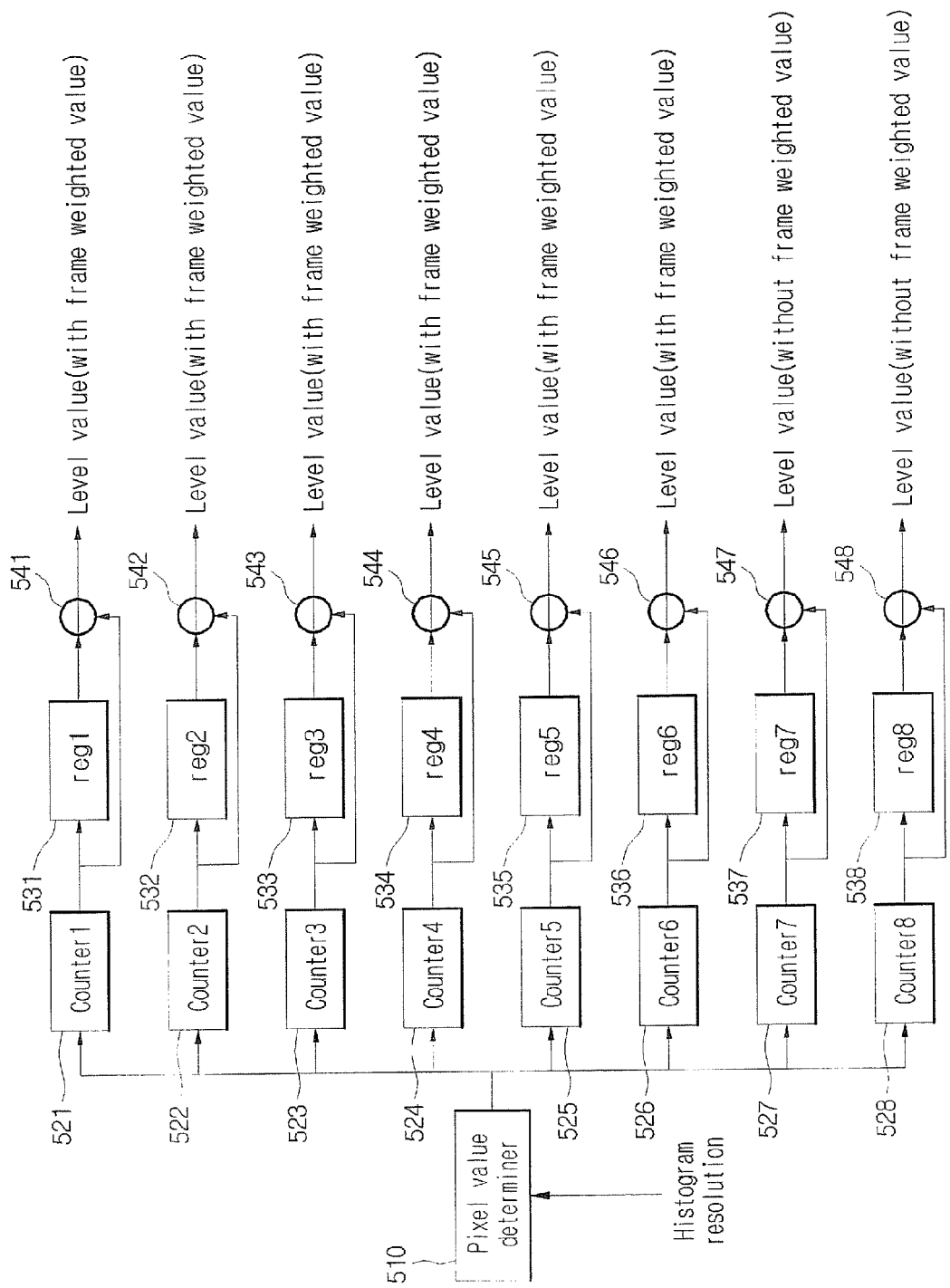
FIG. 4 shows a block diagram of an interval histogram generator in accordance with an embodiment of the present invention.

The histogram generator shown in FIG. 4 can be applied in case a series of frames are changed. If there are minute changes in a series of frames, it can not be determined that each frame has the same number of image component data, and thus there is no need for compensation. The histogram generator 500 shown in FIG. 4 is structure to intentionally compensate the change between the frames.

Referring to FIG. 4, the interval histogram generator 500 has a pixel value determiner or determination module 510, 8 counters 521-528, 8 registers 531-538 connected to each counter and 8 subtractors 541-548 subtracting output values of the counters and output values of the registers. Once the steps for generating a histogram begin, the counters and registers are reset.

The pixel value determiner 510 determines whether the inputted image component data value belongs to each detection interval range, determined by the histogram resolution (N) and the range of image component data value (R), and outputs the detection signal to the counter 521-528 counting the detection interval to which the image component data value belongs. The pixel value determiner 510 can be realized by using a demultiplexer. The image component data value, inputted to the pixel value determiner 510, can be either an analog signal or a digital signal. The pixel value determiner 510 increases the range of detection interval by the basic detection unit (U) for each frame. The detection interval of the pixel value determiner 510 that changes for each frame is shown in (A) of FIG. 6. The start value (RS) and end value (RE) of each detection interval for each frame are defined as follows:

$RS=(R/X)*k$, whereas $k=0,1,\ldots,X-1$ $RE=RS+(U*m-1)$, whereas $m=1, 2, \ldots, F$    EQ. 3

If R (range of image component data value) is 256, N (histogram resolution) is 32, U (basic detection unit) is 8, and X (number of counters) is 8, F (number of frames needed to generate a histogram) is 4 (refer to (A) of FIG. 6). In the first frame, each range of the 8 detection intervals is 0-7, 32-39, 64-71, 96-103, 128-135, 160-167, 192-199 and 224-231, respectively. In the second frame, each range of the 8 detection intervals is 0-15, 32-47, 64-79, 96-111, 128-143, 160-175, 192-207 and 224-239, respectively. Likewise, the start value of each interval is fixed while the end value is increased by 8.

In Frame1, if the image component data value is between 0 and 7, the pixel value determiner 510 outputs the detection signal to Counter1 521. While in Frame1, Counter1 increases the count value by 1 each time it receives the detection signal, and outputs the count value once Frame1 is completed. The output value of Counter1 521 for Frame1 is the value of the first level (image component data value range of 0-7) of the histogram. Subtractor1 541 outputs the resultant of subtraction of the output (0 since it is reset) of Register1 531 from the output value of Counter1 521. At the same time, the output value of Counter1 521 is stored in Register1 531.

In Frame2, if the image component data value is between 0 and 15, the pixel value determiner 510 outputs the detection signal to Counter1 521. While in Frame2, Counter1 increases the count value by 1 each time it receives the detection signal, and outputs the count value once Frame2 is completed. The second level value (image component data value range of 8-15) is calculated by Subtractor1 541, which subtracts the output value of Counter1 on Frame1 (previous frame) stored in Register1 531 from the output value of Counter1 on Frame 2 (current frame). In the same manner, the first through the fourth level values (the number of image component data belonging to 0-7, 8-15, 16-23 and 24-31) of the histogram are calculated by Counter1 521, Register1 531 and Subtractor1 541. Since each of Counter1 521 through Counter8 528 counts the number of image component data belonging to a different range of detection interval, all of the 32 level values of the histogram is generated once Frame4 is counted. The level values outputted from the interval histogram generator having the structure of FIG. 4 are shown in (C) of FIG. 6.

The steps of the interval histogram generator 500 with 8 detection intervals, i.e., 8 counters, shown in FIG. 4, are generally as follows. Comparing with a previous frame (the frame of k−1), the pixel value determiner 510 expands the detection interval by fixing the start value of the detection interval and increasing the end value by the basic detection unit in the current frame (frame of k). Accordingly, each counter redundantly counts image component data already detected in the previous frame as well as image component data belonging to the expanded interval in the current frame. If there is a minute change between the previous frame and the current frame, the number of image component data belonging to the expanded interval is accurate regardless of the change in image although the number of image component data belonging to the detection interval of the previous frame and the number of image component data belonging to the identical detection interval (detection interval of the previous fame) counted in the current frame are different. In other words, the output value of the counter in the current frame is error-free.

Figure 5:
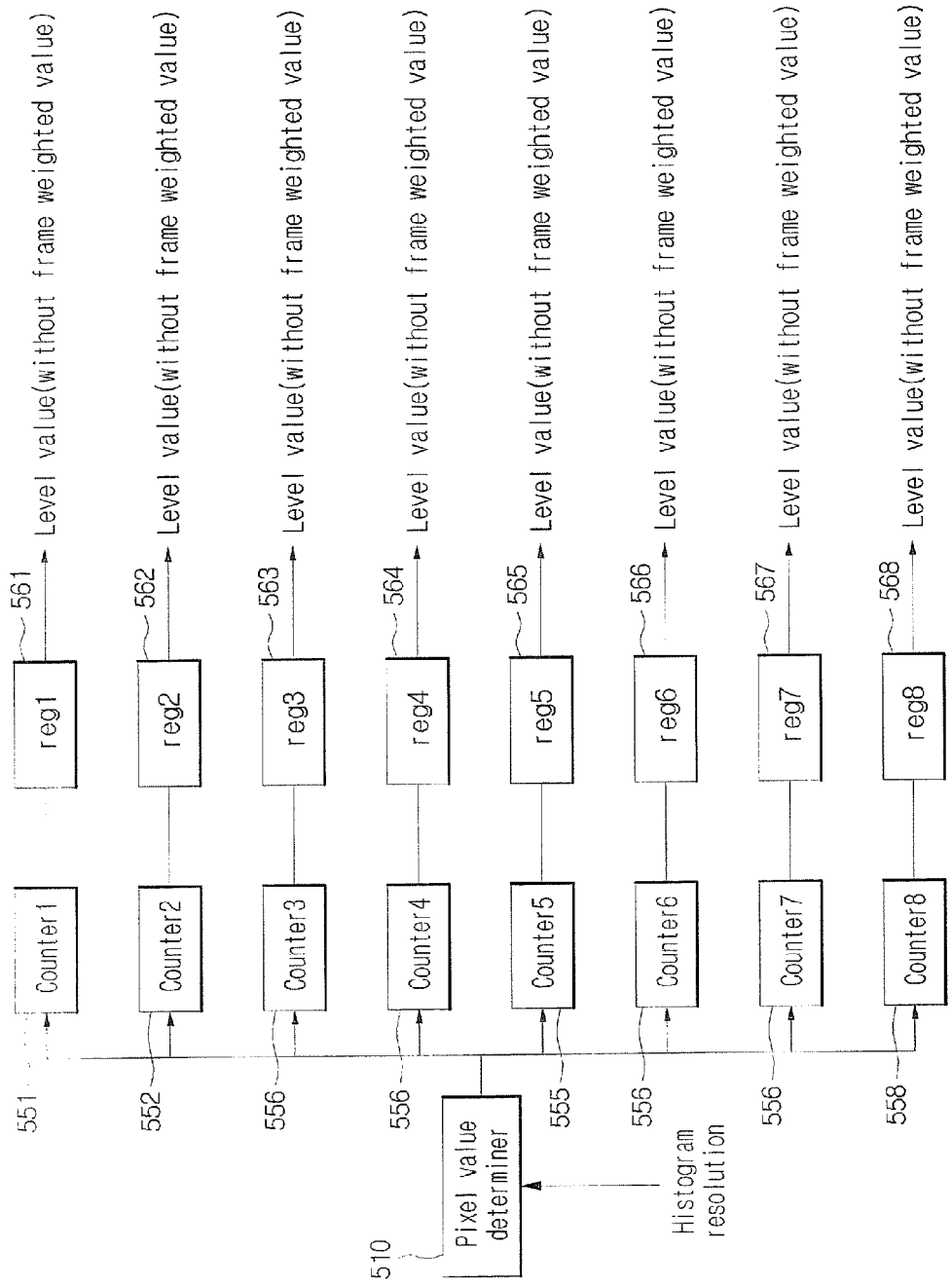
FIG. 5 shows a block diagram of an interval histogram generator in accordance with another embodiment of the present invention.

The interval histogram generator 500 shown in FIG. 5 can be applied when a series of frames have no change. That is because there is no change in the number of image component data if a series of frames have the same image. The pixel value determiner 510 changes the start value and end value of the detection interval at the same time in each frame. In case a 320-level histogram is generated using 8 counters, as shown in (B) of FIG. 6, each counter has to calculate 4 level values. When the pixel value determiner 510 detects image component data belonging to each detection interval as it simultaneously changes the start value and end value of the detection interval, as shown in (B) of FIG. 6, the pixel value determiner 510 the detection signal to the counter, which counts the detection interval. Once the detection in the current frame is completed, the counters 551-558, counting the generated detection signal, output the count value to the registers 561-568. The output value is temporarily stored in the registers 561-568.

A memory 600 accumulates and stores the level value outputted from the interval histogram generator 500 in each frame. In the case of the 32-level histogram, illustrated in FIG. 6, Frame1 outputs the first, 5th, 9th, 13th, 17th, 25th and 29th level values; Frame2, the second, 6th, 10th, 14th, 18th, 22nd, 26th and 30th level values; Frame3, the third, 7th, 15th, 19th, 23rd, 27th and 31st level values; and Frame4, the fourth, 8th, 12th, 16th, 20th, 24th, 28th and 32nd level values. After the level values for Frame4 are outputted, the entire 32 level values are accumulated in the memory, enabling to output the histogram. For both cases of considering a weighted value (FIG. 4) and not considering a weighted value (FIG. 5), the output value means the same level value (refer to (C) of FIG. 6).

FIG. 7 shows an embodiment that fixes the start value and changes the end value of the detection interval of the pixel value determiner according to the change in histogram resolution, and FIG. 8 shows the change in detection interval of the pixel value determiner according to the change in the number of counters.

In FIG. 7, the number of counters is fixed to 8 while the histogram resolution is changed to 16, 32 and 64. When the histogram resolution is 16, 2 frames are needed to calculate all values of the 16 levels (refer to EQ. 2). In the same manner, 4 and 8 frames are needed when the histogram resolution is 32 and 64, respectively. Changing the histogram resolution necessitates that the start value and end value of the detection interval of the pixel value determiner be changed. The detection intervals of the pixel value determiner for generating a 32-level histogram using 8 counters, which has been described earlier, are shown in (B) of FIG. 7. If the histogram resolution is set to 16, the start value of the detection interval is identical to the case of the histogram resolution of 32, but the end value and the basic detection unit change. Likewise, if the histogram resolution is set to 64, the start value of the detection interval remains the same as that of other resolutions, but the end value and the basic detection unit become different. Since the image sensor generates 15 frames per second under the optimal condition, 16 frames are needed if the histogram resolution is set to 128. In this case, since it is unlikely that successive frames have the same image, it is highly possible that the generated histogram contains errors.

In FIG. 8, the histogram resolution is fixed to 32 while the number of counters is changed to 8, 4 and 2. When there are 8 counters, 4 frames are needed to calculate all of the 32 level values. Likewise, 8 and 16 frames are needed when there are 4 and 2 counters, respectively. If the number of counters is changed, the start values and end values of the detection intervals of the pixel value determiner may be also changed.

The detection intervals of the pixel value determiner for generating the 32-level histogram using the 8 counters described above are shown in (A) of FIG. 8. If there are 4 counters, the basic detection interval remains the same, but the start value and end value of the detection interval become different from those of 8 counters. Likewise, if there are 2 counters, the basic detection unit remains the same while the start value and end value change. Since the image sensor generates 15 frames per second under the optimal condition, if the histogram resolution is set to 32 when there are 2 counters, it becomes unlikely that successive frames have the same image, and it becomes highly possible that the generated histogram contains errors.

Above, as the range of detection interval is increased by the basic detection unit in each frame, the count value, stored in the register, of the previous frame was subtracted. However, it is evident that the same histogram, except that the level values are calculated in a different order, can be generated although the image component data belonging to the maximum range of each detection interval is counted in the first frame and then the count value of the previous frame is subtracted as the next frame is decreased by the basic detection unit.

Although a preferred embodiment of the present invention has been described, anyone of ordinary skill in the art to which the invention pertains should be able to understand that a very large number of permutations are possible without departing the spirit and scope of the present invention, which shall only be defined by the claims appended below.

Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart front the spirit and scope of the invention are deemed to be covered by the invention which is limited only by the claims which follow. The scope of the disclosure is not intended to be limited to the embodiments shown herein, but is to be accorded the full scope consistent with the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. Section 112, sixth paragraph, unless the element is expressly recited using the phrase "means for" or, in the case of a method claim, the element is recited using the phrase "step for."

What is claimed is:

1. A histogram generating device, comprising:
   a brightness signal generating module, the brightness signal generating module generating a brightness signal derived from RGB component data of an input frame, the RGB component data representing an image;

an image component data selecting module, the image component data selecting module outputting a plurality of single component frames consisting of image component data, the image component data being one of the RGB component data and the brightness signal; and an interval histogram generating module, the interval histogram generating module generating a level value obtained by calculating the number of occurrences of a predetermined range of the image component data occurring within each predetermined region of the plurality of single component frames, each said predetermined region being substantially changed in each of the single component frames.

2. The device of claim 1, wherein each of said predetermined range of the image component data is determined based, at least in part, upon a histogram resolution.

3. The device of claim 2, wherein the histogram resolution is changeable.

4. The device of claim 1, wherein the plurality of single component frames are successive single component frames.

5. The device of claim 1, wherein the interval histogram generating module comprises:
a pixel value determination module, the pixel value determination module outputting a detection signal related to a corresponding predetermined region of the plurality of single component frames when detecting the image component data included in the plurality of predetermined regions;
a plurality of counters, the counter counting the detection signal for each of the plurality of predetermined regions;
a plurality of registers, the register storing an output value of the counter for a $k-1^{th}$ single component frame; and
a plurality of subtractors, the subtractor calculating a difference between an output value of the counter for a $k^{th}$ single component frame and the value stored in the register.

6. The device of claim 1, wherein the interval histogram generating module comprises:
a pixel value determination module, the pixel value determination module outputting a detection signal related to a corresponding predetermined region of the plurality of single component frames when detecting the image component data included in the plurality of predetermined regions;
a plurality of counters, the counter counting the detection signal for each of the plurality of predetermined regions; and
a plurality of registers, the register storing an output value of each of the counters.

7. The device of claim 1, further comprising a low-pass filter, filtering the RGB component data and outputting the RGB component data to the brightness signal generating module.

8. The device of claim 1, wherein each of said predetermined range of the image component data is determined based, at least in part, upon a histogram resolution.

9. The device of claim 1, wherein the plurality of single component frames are successive single component frames.

10. A histogram generating device, comprising:
a brightness signal generating module, the brightness signal generating module generating a brightness signal derived from RGB component data of an input frame;
a scaling module, the scaling module regularizing a single component frame consisting of the brightness signal; and
an interval histogram generating module, the interval histogram generating module generating a level value by calculating the number of occurrences of a predetermined range of the image component data occurring within each predetermined region of the plurality of single component frames, each said predetermined region being substantially changed in each of the single component frames.

11. The device of claim 10, wherein each of said predetermined range of the image component data is determined based, at least in part, upon a histogram resolution.

12. The device of claim 11, wherein the histogram resolution is changeable.

13. The device of claim 10, wherein the plurality of single component frames are successive single component frames.

14. A histogram generating device, comprising:
a pixel value determination module, outputting a detection signal related to a corresponding detection interval when detecting the image component data included in the plurality of detection intervals, a start value of the detection interval being fixed and an end value of the detection interval being changed for each of a plurality of successive frames;
a plurality of counters, the counter counting the detection signal for each of the detection intervals;
a plurality of registers, the register storing an output value of the counter for a $k-1^{th}$ frame, k being larger than 1 and smaller than or equal to the number of frames (F) needed to calculate a histogram; and
a plurality of subtractors, the subtractor calculating a difference between an output value of the counter for a $k^{th}$ frame and the value stored in the register.

15. The device of claim 14, further comprising a scaling module, regularizing the size of the frame.

16. The device of claim 14, wherein the number of the counters is identical to the number of the detection intervals.

17. The device of claim 14, wherein the pixel value determination module changes the end value of the detection interval in accordance with a histogram resolution.

18. The device of claim 17, wherein the number of frames (F) needed to calculate the histogram is determined by a range of the image component data values and the histogram resolution.

19. A histogram generating device, comprising:
a pixel value determination module, outputting a detection signal related to a corresponding detection interval when detecting the image component data included in the plurality of detection intervals, a start value and an end value of the detection interval being changed for each of a plurality of successive frames;
a plurality of counters, the counter counting the detection signal for each of the detection intervals; and
a plurality of registers, the register storing an output value of each of the counters.

20. The device of claim 19, further comprising a scaling module, regularizing the size of the frame.

21. The device of claim 19, wherein the number of the counters is identical to the number of the detection intervals.

22. The device of claim 19, wherein the pixel value determination module changes the end value of the detection interval in accordance with a histogram resolution.

23. The device of claim 22, wherein the number of frames (F) needed to calculate the histogram is determined by a range of the image component data values and the histogram resolution.

24. A histogram generating device, comprising:

a brightness signal generating means for generating a brightness signal based upon RGB component data of an input frame, the RGB component data representing an image;

an image component data selecting means for outputting a single component frame consisting of image component data, the image component data being one of the RGB component data and the brightness signal;

an interval histogram generating means for generating a level value obtained by calculating the number of image component data belonging to each level grouped based, at least in part, upon a resolution in each predetermined range of the plurality of successive single component frames; and a memory, the memory storing a plurality of the level values generated for each of the single component frames.

25. A method for generating histogram, comprising the steps of:

using a brightness signal generating module for generating a brightness signal derived from RGB component data of an input frame, the RGB component data representing an image;

using an image component data selecting module for outputting a plurality of single component frames consisting of image component data, the image component data being one of the RGB component data and the brightness signal; and using an interval histogram generating module for generating a level value obtained by calculating the number of occurrences of a predetermined range of the image component data occurring within each predetermined region of the plurality of single component frames, each said predetermined region being substantially changed in each of the single component frames.

* * * * *